US012671292B2

(12) United States Patent
Ma et al.

(10) Patent No.: US 12,671,292 B2
(45) Date of Patent: Jun. 30, 2026

(54) MOTOR SHELL, MANUFACTURING METHOD OF MOTOR SHELL, AND ELECTRIC FAN

(71) Applicants: CHAMP TECH OPTICAL (FOSHAN) CORPORATION, Foshan (CN); Foxconn Technology Co., Ltd., New Taipei (TW)

(72) Inventors: Xiao-Guang Ma, Foshan (CN); Yung-Ping Lin, New Taipei (TW); Zheng Luo, Foshan (CN); Peng-Fei Mai, Foshan (CN); Yong-Kang Zhang, Shenzhen (CN)

(73) Assignees: CHAMP TECH OPTICAL. (FOSHAN) CORPORATION, Foshan (CN); Foxconn Technology Co., Ltd, New Taipei (TW)

( * ) Notice: Subject to any disclaimer, the term of this patent is extended or adjusted under 35 U.S.C. 154(b) by 0 days.

(21) Appl. No.: 18/824,478

(22) Filed: Sep. 4, 2024

(65) Prior Publication Data

US 2025/0379484 A1     Dec. 11, 2025

(30) Foreign Application Priority Data

Jun. 7, 2024     (CN) .......................... 202410743854.2

(51) Int. Cl.
*H02K 5/16* (2006.01)
*F04D 25/06* (2006.01)
(Continued)

(52) U.S. Cl.
CPC ............. *H02K 5/163* (2013.01); *F04D 25/06* (2013.01); *F04D 29/056* (2013.01);
(Continued)

(58) Field of Classification Search
CPC ........ H02K 5/163; H02K 7/085; H02K 15/14; H02K 21/22; F04D 25/06; F04D 29/056; F04D 29/325
See application file for complete search history.

(56) References Cited

U.S. PATENT DOCUMENTS 5,982,064 A * 11/1999 Umeda ................... F16C 21/00
                                                            310/90
6,270,325 B1 * 8/2001 Hsieh ...................... F04D 25/08
                                                            417/423.12
(Continued)

FOREIGN PATENT DOCUMENTS

CN        216252443 U  * 4/2022

*Primary Examiner* — Jesse S Bogue
(74) *Attorney, Agent, or Firm* — ScienBiziP, P.C.

(57) ABSTRACT

This application provides a motor shell, manufacturing method of motor shell, and electric fan. The motor shell includes an outer shell and a connecting part. The outer shell defines a holding cavity with an opening at one end of it. The connecting part extends along an axial direction of the outer shell on the holding cavity. The connecting part defines a matching surface which is at one end of the connecting part away from the bottom wall of the holding cavity. The matching surface is configured to abut against an inner ring of a bearing. A beneficial effect of this application is that a flatness of the matching surface is easier to improve, which is conducive to increasing a contact area between the matching surface and the inner ring, improving supporting effects of the bearing, reducing skids of the bearing and wears caused by the skids.

8 Claims, 6 Drawing Sheets

100

(51) Int. Cl.
      *F04D 29/056*      (2006.01)
      *F04D 29/32*       (2006.01)
      *H02K 7/08*        (2006.01)
      *H02K 15/14*      (2006.01)
      *H02K 21/22*      (2006.01)

(52) U.S. Cl.
      CPC ........... *F04D 29/325* (2013.01); *H02K 7/085* (2013.01); *H02K 15/14* (2013.01); *H02K 21/22* (2013.01)

(56) References Cited

U.S. PATENT DOCUMENTS

| | | | | |
|---|---|---|---|---|
| 6,511,303 | B2 * | 1/2003 | Obara ................. | F04D 25/0606 |
| | | | | 417/423.12 |
| 6,533,559 | B2 * | 3/2003 | Hsieh ................... | F04D 25/062 |
| | | | | 417/220 |
| 7,070,336 | B2 * | 7/2006 | Horng ..................... | F16C 25/08 |
| | | | | 384/563 |
| 7,176,595 | B1 * | 2/2007 | Chou ................... | H02K 5/1675 |
| | | | | 310/90 |
| 9,435,348 | B2 * | 9/2016 | Wu ...................... | F04D 25/0646 |
| 12,355,304 | B2 * | 7/2025 | Holmqvist .............. | H02K 9/19 |
| 2017/0159707 | A1 * | 6/2017 | Yamawaki .............. | F04D 25/06 |

* cited by examiner

100

100

11

(a)        (b)        (c)        (d)

(e)        (f)        (g)        (h)

MOTOR SHELL, MANUFACTURING METHOD OF MOTOR SHELL, AND ELECTRIC FAN

FIELD

The present disclosure relates to field of electric fan technology, and in particular to a motor shell, manufacturing method of motor shell, and electric fan.

BACKGROUND

In some existing technologies, motor rotor includes a motor shell and a shaft core. In order to provide a rotatable support for the shaft core, it is necessary to provide a bearing surrounding the shaft core. However, existing support of the bearing applied in the technologies is poor.

Thus, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to make the above-mentioned objects, features and advantages of the present application more obvious, a detailed description of specific embodiments of the present application will be described in detail with reference to the accompanying drawings. A number of details are set forth in the following description so as to fully understand the present application. However, the present application can be implemented in many other ways different from those described herein, and those skilled in the art can make similar improvements without violating the contents of the present application. Therefore, the present application is not to be considered as limiting the scope of the embodiments described herein.

Several definitions that apply throughout this disclosure will now be presented.

The term "coupled" is defined as coupled, whether directly or indirectly through intervening components, and is not necessarily limited to physical connections. The connection may be such that the objects are permanently coupled or releasably coupled. The term "substantially" is defined to be essentially conforming to the particular dimension, shape, or other feature that the term modifies, such that the component need not have that exact feature. The term "comprising," when utilized, means "including, but not necessarily limited to"; it in one embodiment indicates open-ended inclusion or membership in the so-described combination, group, series, and the like.

Unless otherwise defined, all technical and scientific terms used herein have the same meaning as commonly understood by one skilled in the art. The terms used in a specification of the present application herein are only for describing specific embodiments and are not intended to limit the present application. The terms "and/or" used herein includes any and all combinations of one or more of associated listed items.

Figure 1:
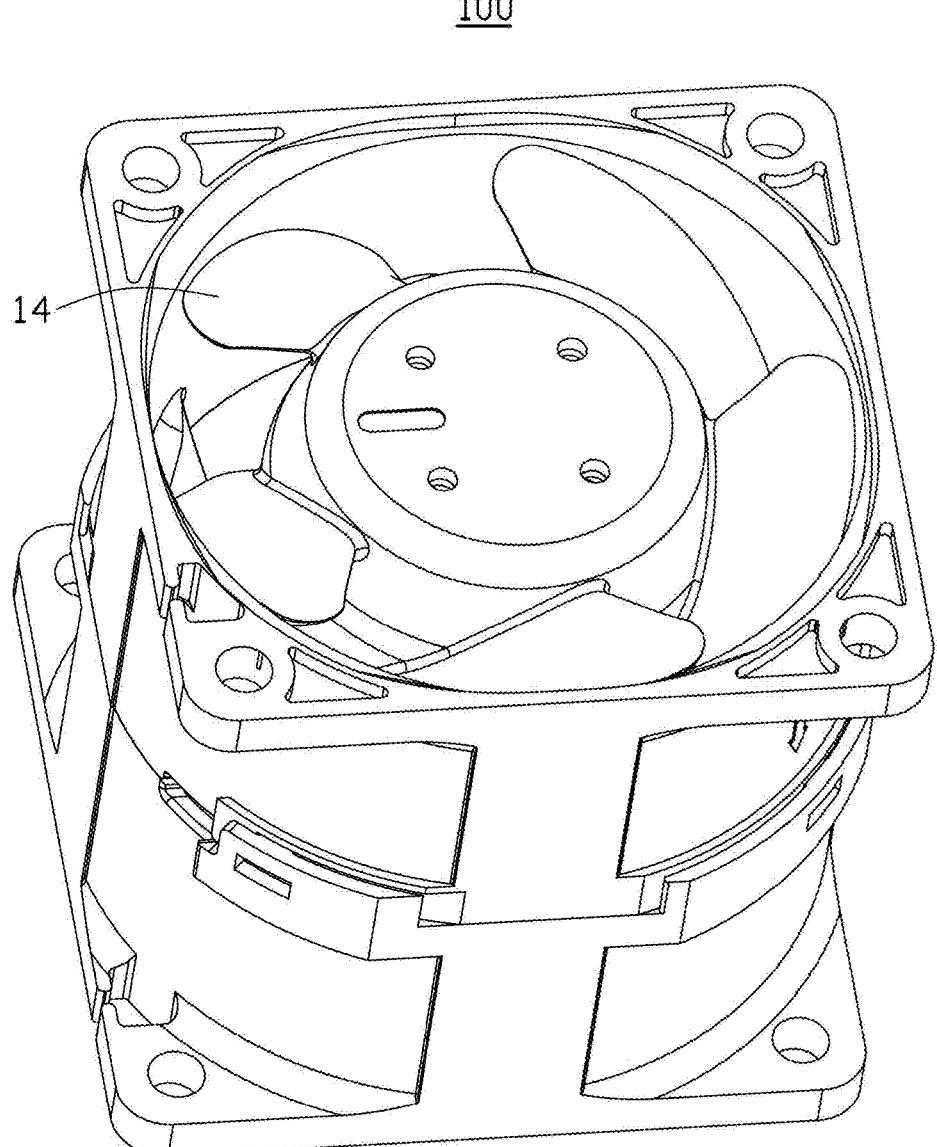
FIG. 1 shows a structure diagram of an electric fan of a present application in an embodiment.
Figure 2:
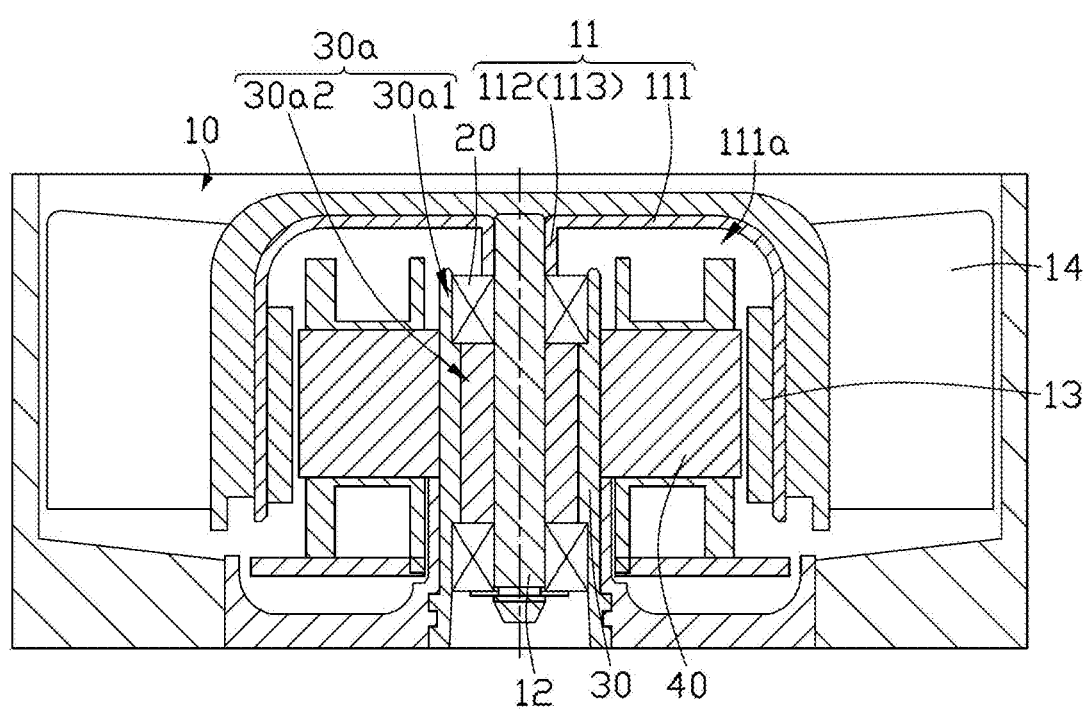
FIG. 2 shows cross section view explosion diagram of the electric fan of a present application in an embodiment.

Referring to FIG. 1 to FIG. 2, in one embodiment, the electric fan 100 includes a rotor assembly 10, a bearing 20, a support member 30, and a stator assembly 40.

Figure 3:
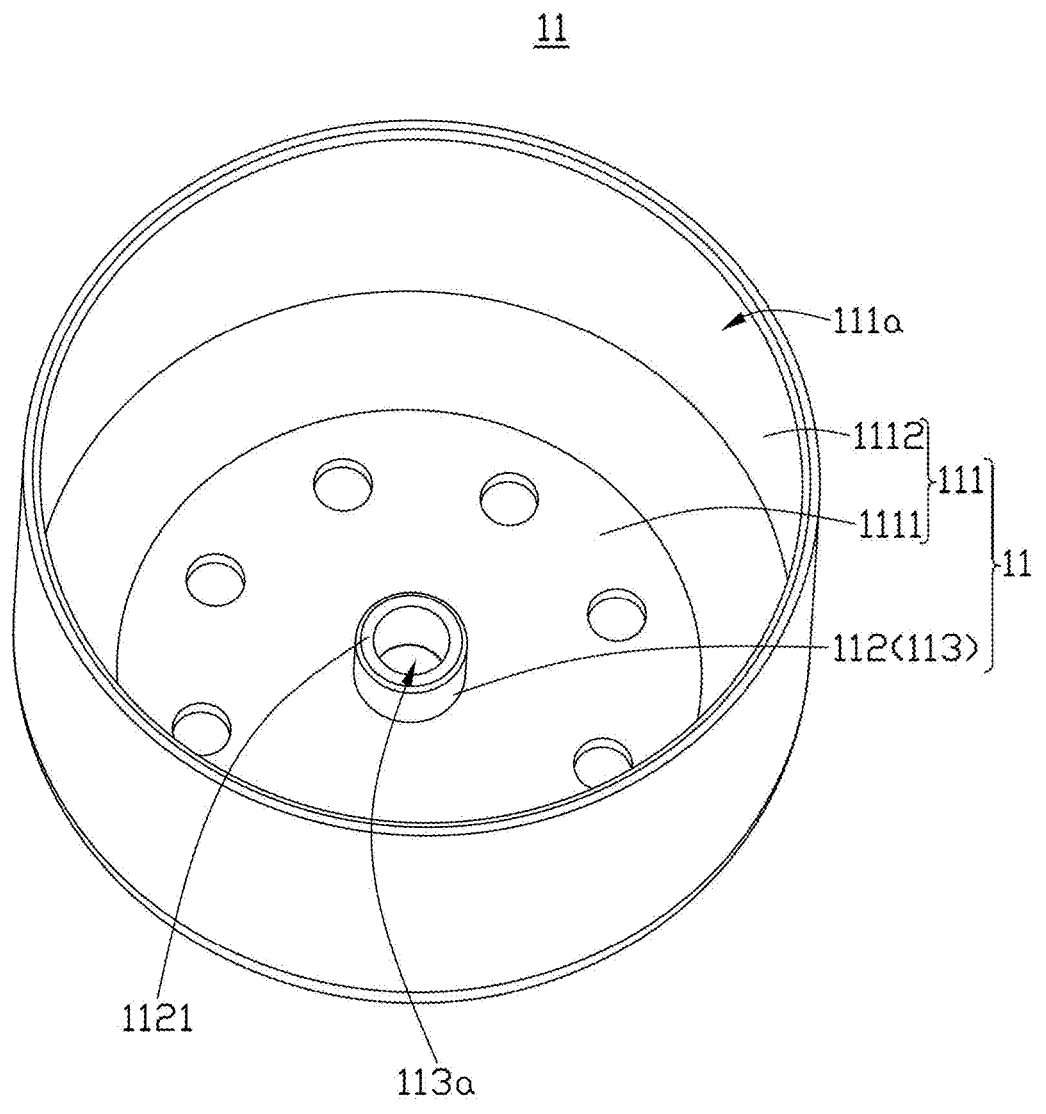
FIG. 3 shows a structure diagram of a motor shell of a present application in an embodiment.
Figure 4:
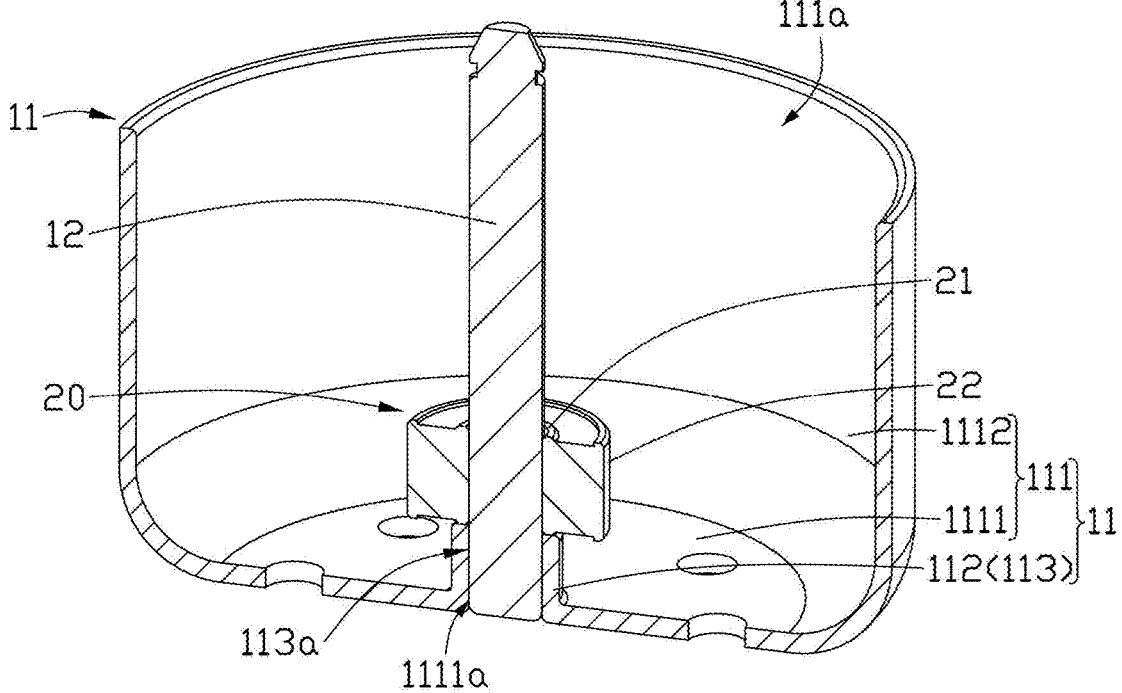
FIG. 4 shows a cross section view of the motor shell, a bearing and a shaft core of a present application in an embodiment.

Referring to FIG. 2 to FIG. 3, the rotor assembly 10 includes a motor shell 11, a shaft core 12, a magnetic member 13, and one or more fan blades 14. The motor shell 11 includes an outer shell 111 and a connecting part 112. The outer shell 111 defines a holding cavity 111a, an opening is provided at one end of the holding cavity 111a. The connecting part 112 is provided on a bottom wall of the holding cavity 111a and extends along an axial direction of the outer shell 111. One end of the shaft core 12 passes through the connecting part 112 along the axial direction of the outer shell 111. The magnetic member 13 is arranged on a side wall of the holding cavity 111a. One or more fan blades 14 are arranged on a peripheral side of the outer shell 111. Referring to FIG. 3 to FIG. 4, the inner ring 21 of the bearing 20 is connected to an outer peripheral surface of the shaft core 12 and abuts against a matching surface 1121. The support member 30 is arranged on an outer peripheral surface of an outer ring 22 of the bearing 20. The stator assembly 40 is arranged on an outer peripheral surface of the support member 30.

When the electric fan 100 is used, the stator assembly 40 is connected with a current to generate a changing magnetic field, so that the magnetic member 13 rotates under an action of the changing magnetic field. When the magnetic member 13 rotates, the magnetic member 13 drives the motor shell 11, the fan blades 14 and the shaft core 12 to rotate around the axis of the outer shell 111, and then realizes a heat dissipation function through rotations of the fan blades 14.

Therefore, by holding the matching surface 1121 abut against the inner ring 21 of the bearing 20, it is conducive to increasing a contact area between the matching surface 1121 and the inner ring 21 of the bearing 20, which is conducive to improving a support effect of the bearing 20, reducing skids of the bearing 20 and wears caused by the skids, thereby improving a service performance of the electric fan 100 and extending a service life of the electric fan 100.

Referring to FIG. 3, in one embodiment, the motor shell 11 includes an outer shell 111 and a connecting part 112.

Referring to FIG. 3 to FIG. 4, the outer shell 111 defines a holding cavity 111a, an opening is provided at one end of the holding cavity 111a. The connecting part 112 extends along the axial direction of the outer shell 111 on a bottom wall of the holding cavity 111a. The connecting part 112 defines the matching surface 1121, the matching surface 1121 is at one end of the connecting part 112 away from the bottom wall of the holding cavity 111a. The matching surface 1121 is configured to abut against the inner ring 21 of the bearing 20.

The motor shell 11 defines the connection part 112, and the matching surface 1121 of the connecting part 112 abuts against the inner ring 21 of the bearing 20, so that a contact area between the matching surface 1121 and the inner ring 21 of the bearing 20 can be increased by improving a flatness of the matching surface 1121 along the axial direction of the outer shell 111, and a supporting effect of bearing 20 can be improved, and slippages of the bearing 20 and wears caused by the slippages can be reduced. Since the flatness of the matching surface 1121 is easier to improve than a flatness of the bottom wall of the holding cavity 111*a*, a setting of the connection part 112 is conducive to improving the support effect of the bearing 20 and reducing the slippages of the bearing 20, thus improving a service performance of the electric fan 100 and extending a service life of the electric fan 100.

Related technologies provide a motor shell which is provided with an abutting member, the abutting member abuts against an inner ring of a bearing to support the bearing. The abutting member can be a gasket or a spring. However, in this application embodiment, there is no need to provide any abutting members between the matching surface 1121 and the inner ring 21 of the bearing 20, thereby reducing a manufacturing cost and simplifying assembly steps of the electric fan 100.

In one embodiment, the flatness of the matching surface 1121 is less than 0.03 mm to further increase a contact area between the matching surface 1121 and the bearing 20, thereby further improving the support effect of the bearing 20 and reducing slippages and wears of the bearing 20. Therefore, the service performance of the electric fan 100 is further improved, and the service life of the bearing 20 is extended.

Figure 5:
FIG. 5 shows a cross section view of the motor shell of a present application in an embodiment.
Figure 5:
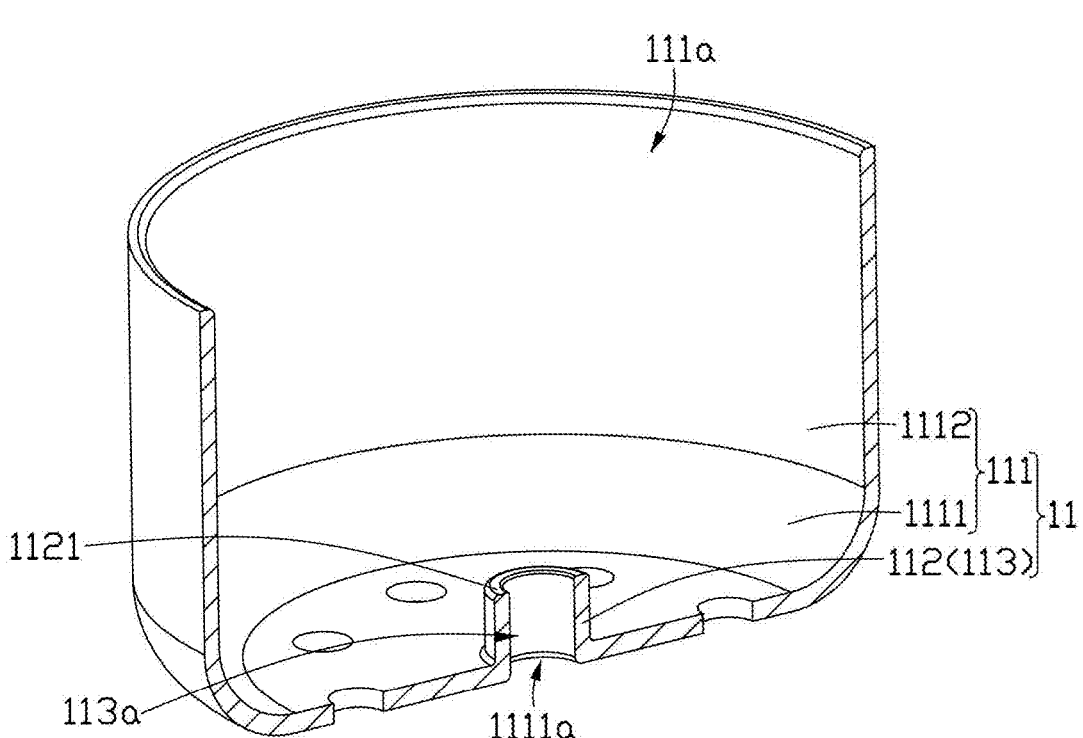

Referring to FIG. 5, in one embodiment, the outer shell 111 includes a bottom plate 1111 and a lateral plate 1112. The lateral plate 1112 is arranged around the bottom plate 1111 to form the holding cavity 111*a*. The bottom plate 1111 is provided with a through hole 111*a*. The connecting part 112 includes a ring plate 113, the ring plate 113 extends from an edge of the through hole 111*a* away from the bottom wall of the holding cavity 111*a*. A surface of an end of the ring plate 113 away from the bottom plate 1111 is the matching surface 1121. The ring plate 113 is provided with a mounting hole 113*a*, the mounting hole 113*a* is configured to fix one end of the shaft core 12. The inner ring 21 of the bearing 20 is connected to an outer peripheral surface of the shaft core 12 and abuts against the matching surface 1121.

In this way, the shaft core 12 is fixedly installed in the motor shell 11 through the mounting hole 113*a*, so that the shaft core 12 can rotate together with the motor shell 11 around the axis of the outer shell 111 when the motor shell 11 rotates. The inner ring 21 of the bearing 20 is fitted onto the outer surface of the shaft core 12 to provide rotatable support for the shaft core 12 and improve a rotating precision of the shaft core 12.

In one embodiment, the ring plate 113 and the base plate 1111 are integrally formed to improve production accuracies of the ring plate 113, for example, to control the flatness of the mating surface 1121.

In one embodiment, the shaft core 12 is riveted with the connection part 112 so that there is a greater bonding force between the shaft core 12 and the motor shell 11, and a connection process between the shaft core 12 and the motor shell 11 is simpler. It should be noted that an electric fan is provided in related technologies, and the electric fan is arranged with a shaft sleeve passing through the motor shell, and the shaft core passes through the shaft sleeve to rivet the motor shell, the shaft sleeve and the shaft core. However, the motor shell, the shaft sleeve and the shaft core are riveted together, resulting in greater cumulative tolerances. In addition, a material of the shaft sleeve is usually copper, resulting in a poor strength of the shaft sleeve. In one embodiment of this application, by riveting the connection part 112 directly with the shaft core 12, a binding force between the shaft core 12 and the motor shell 11 is increased by more than 30%, so that operation reliabilities of the electric fan 100 are greatly improved and costs of the shaft sleeve are reduced.

In other embodiments, the shaft core 12 is spot-welded with the connection part 112, so that the binding force between the shaft core 12 and the motor shell 11 is higher.

In other embodiments, the shaft core 12 is spot-welded and riveted to the connection part 112.

Referring to FIG. 2, in one embodiment, the support member 30 defines a step hole 30*a*. The step hole 30*a* includes a first hole segment 30*a*1 and a second hole segment 30*a*2. The first hole segment 30*a*1 is configured to receive the bearing 20. The second hole segment 30*a*2 is connected to one end of the first hole segment 30*a*1 away from the bottom wall of the holding cavity 111*a*. An aperture of the second hole segment 30*a*2 is less than an aperture of the first hole segment 30*a*1. An inner surface of the first hole segment 30*a*1 abuts against the outer ring 22 (referring to FIG. 4) of the bearing 20.

Thus, by setting the first hole segment 30*a*1 to receive the bearing 20 to limit a peripheral position of the bearing 20, it is beneficial to improve a positioning accuracy of the bearing 20 and avoid a deviation of the bearing 20 when rotating relative to the support member 30, so as to reduce possibilities of the bearing 20 failure. The bottom wall of the first hole segment 30*a*1 is connected to the outer ring 22 of the bearing 20 to provide an axial support to the outer ring 22 of the bearing 20 along the axial direction of the outer shell 111. In addition, when the electric fan 100 is in an actual use, if the electric fan 100 is subjected to external impacts, the support member 30 can also provide a cushioning effect and avoid displacements of the bearing 20 due to the impacts.

Figure 6:
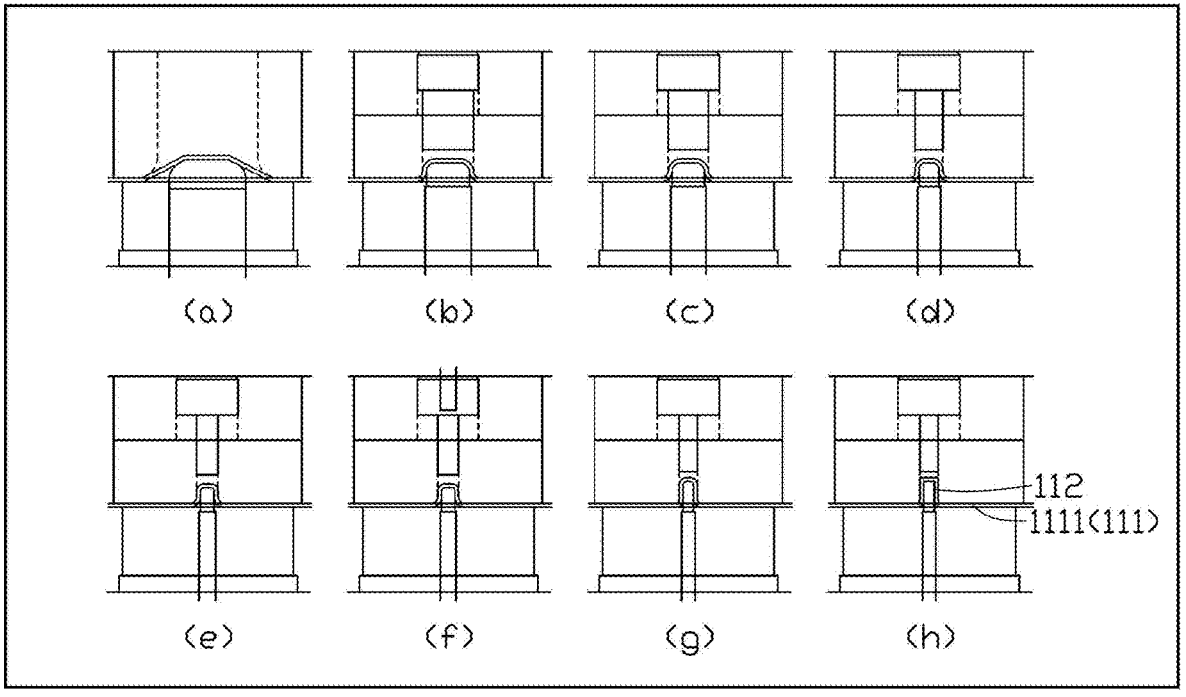
FIG. 6 shows a schematic diagram of a step S110 of a manufacturing method of motor shell of a present application in an embodiment.

This application further provides a manufacturing method of motor shell for manufacturing the motor shell 11 in any of above embodiments. Referring to FIG. 6, the manufacturing method of motor shell includes following steps.

S110: stretching a bottom of the outer shell 111 toward the holding cavity 111*a* (referring to FIG. 5) to form the connecting part 112.

In the manufacturing method of motor shell, the connection part 112 is formed by drawing the bottom of the outer shell 111 towards the holding cavity 111*a*, so that the matching surface 1121 of the stretched connection part 112 is easy to be processed, so as to easily improve the flatness of the matching surface 1121, and then the contact area between the matching surface 1121 and the inner ring 21 of the bearing 20 is increased. Therefore, it is conducive to improving the support effect of the bearing 20 and reducing skids of the bearing 20 and wears caused by the skids.

In one embodiment, in step S110, the bottom of the outer shell 111 is drawn 6 to 10 times towards the holding cavity 111*a*, so that a dimension of the connection part 112 along the axis direction of the outer shell 111 reach a preset height and the connection part 112 has better structural strengths.

In one embodiment, referring to (a) to (h) in FIG. 5, the bottom of the outer shell 111 is drawn eight times towards the holding cavity 111*a*. A number of drawing times to the bottom of the outer shell 111 can be selected according to a preset height of the connection part 112.

In one embodiment, after the step S110, the manufacturing method of motor shell further includes: S120: smoothing the matching surface 1121 so that a flatness of the matching surface 1121 is less than a preset flatness value.

Thus, the flatness of the matching surface 1121 is improved by smoothing the matching surface 1121, so as to increase the contact area between the matching surface 1121 and the inner ring 21 of the bearing 20, improve the supporting effect of the bearing 20, and reduce the skids of the bearing 20 and the wears caused by the skids. In addition, because of processes of smoothing the matching surface 1121 is relatively simple, the manufacturing method of motor shell is simple, and costs of the manufacturing method of motor shell are low.

In one embodiment, the preset flatness value is 0.03 mm.

In one embodiment, a number of times to smooth the matching surface 1121 can be once.

In other embodiments, the number of times to smooth the matching surface 1121 can also be set as required, such as twice, to further improve the flatness of the matching surface 1121.

In one embodiment, step S120 includes: S121: Extending a flattening punch into the connecting part 112. S122: Pressing a flattening head along the axial direction of the outer shell 111 towards the matching surface 1121, so that the flatness of the matching surface 1121 reaches the preset flatness value.

Thus, by extending the flattening punch into the connection part 112, an inner diameter of the connection part 112 is kept constant while the matching surface 1121 is being straightened. The flatness of the matching surface 1121 is improved by pressing the flattening head along the axial direction of the outer shell 111 towards the matching surface 1121 so as to exert pressures on the connection part 112 through the flattening head.

In one embodiment, before step S120, the manufacturing method of motor shell further includes: S118: cutting a circular hole on the connecting part 112, the circular hole is arranged coaxial with the outer shell 111, and an aperture of the circular hole is equal to an inner diameter of the connecting part 112.

Thus, the circular hole is cut on the connecting part 112 for the shaft core 12 to pass through.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A motor shell, configured for holding a rotor assembly rotationally installed on the motor shell via a bearing, and comprising:

an outer shell, comprising a holding cavity, and an opening at one end of the holding cavity;

a connecting part on and extending from a bottom wall of the holding cavity, an extension direction of the connecting part being parallel to an axial direction of the outer shell, the connecting part comprising a matching surface at one end of the connecting part away from the bottom wall of the holding cavity, wherein the matching surface is configured to abut against an inner ring of the bearing; a tolerance of a flatness of the matching surface along the axial direction of the outer shell is less than 0.03 mm; the outer shell comprises a through hole, the connecting part further comprises a ring plate extending from an edge of the through hole away from the bottom wall of the holding cavity; a surface of an end of the ring plate away from the bottom plate is the matching surface; the ring plate comprises a mounting hole configured to fix one end of a shaft core of the rotor assembly, the inner ring of the bearing is connected to an outer peripheral surface of the shaft core and abuts against the matching surface.

2. The motor shell as claimed in claim 1, wherein, the outer shell comprises a bottom plate and a lateral plate, the lateral plate is arranged around the bottom plate to form the holding cavity; the bottom plate is provided with the through hole.

3. The motor shell as claimed in claim 2, wherein, the ring plate and the bottom plate are integrally formed.

4. An electric fan, comprising:

a rotor assembly, comprising a shaft core, a magnetic member, one or more fan blades, and a motor shell, wherein the motor shell comprises an outer shell and a connecting part; the outer shell comprises a holding cavity, and an opening at one end of the holding cavity, the connecting part is provided on and extending from a bottom wall of the holding cavity, an extension direction of the connecting part is being parallel to an axial direction of the outer shell, the connecting part comprising a matching surface is at one end of the connecting part away from the bottom wall of the holding cavity; a tolerance of a flatness of the matching surface along the axial direction of the outer shell is less than 0.03 mm; the outer shell comprises a through hole, the connecting part further comprises a ring plate extending from an edge of the through hole away from the bottom wall of the holding cavity; a surface of an end of the ring plate away from the bottom plate is the matching surface; the ring plate comprises a mounting hole configured to fix one end of a shaft core of the rotor assembly, the inner ring of the bearing is connected to an outer peripheral surface of the shaft core and abuts against the matching surface; one end of the shaft core extends through the connecting part along the axial direction of the outer shell, the magnetic member is arranged on a side wall of the holding cavity, the one or more fan blades are arranged on a peripheral side of the outer shell;

a bearing, wherein the matching surface is configured to abut against an inner ring of the bearing, the inner ring of the bearing is connected to an outer peripheral surface of the shaft core and abuts against the matching surface;

a support member, arranged on an outer peripheral surface of an outer ring of the bearing; and a stator assembly, arranged on an outer surface of the support member.

5. The electric fan as claimed in claim 4, wherein, the shaft core is spot-welded and/or riveted with the connecting part.

6. The electric fan as claimed in claim 5, wherein, the support member is provided with a step hole comprising a first hole segment and a second hole segment; the first hole segment is configured to receive the bearing; the second hole segment is connected to one end of the first hole segment away from the bottom wall of the holding cavity, an aperture of the second hole segment is less than an aperture of the first hole segment; an inner surface of the first hole segment abuts against the outer ring of the bearing.

7. The electric fan as claimed in claim 4, wherein, the outer shell comprises a bottom plate and a lateral plate, the lateral plate is arranged around the bottom plate to form the holding cavity; the bottom plate is provided with the through hole.

8. The electric fan as claimed in claim 7, wherein, the ring plate and the bottom plate are integrally formed.

* * * * *